(12) United States Patent
Gentry et al.

(10) Patent No.: US 6,996,292 B1
(45) Date of Patent: Feb. 7, 2006

(54) STARING 2-D HADAMARD TRANSFORM SPECTRAL IMAGER

(75) Inventors: Stephen M. Gentry, Albuquerque, NM (US); Christine M. Wehlburg, Albuquerque, NM (US); Joseph C. Wehlburg, Albuquerque, NM (US); Mark W. Smith, Albuquerque, NM (US); Jody L. Smith, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 645 days.

(21) Appl. No.: 10/125,976

(22) Filed: Apr. 18, 2002

(51) Int. Cl.
*G06K 9/36* (2006.01)
*G01J 3/40* (2006.01)

(52) U.S. Cl. ...................... 382/281; 356/305
(58) Field of Classification Search ................ 382/236, 382/255, 276, 281; 356/300–301, 305, 310; 250/216; 435/288.7; 708/400
See application file for complete search history.

(56) References Cited

U.S. PATENT DOCUMENTS

| | | | |
|---|---|---|---|
| 5,048,959 A * | 9/1991 | Morris et al. ................ 356/301 |
| 5,050,989 A * | 9/1991 | Van Tassel et al. .......... 356/310 |
| 5,535,047 A | 7/1996 | Hornbeck ..................... 359/295 |
| 5,561,618 A * | 10/1996 | Dehesh ......................... 708/400 |
| 5,815,602 A * | 9/1998 | Ueda et al. .................. 382/236 |
| 5,828,066 A | 10/1998 | Messerschmidt ....... 250/339.07 |
| 6,034,370 A | 3/2000 | Messerschmidt ....... 250/339.07 |
| 6,128,077 A | 10/2000 | Jovin et al. .................. 356/310 |
| 6,399,935 B1 * | 6/2002 | Jovin et al. .................. 250/216 |
| 6,759,235 B2 * | 7/2004 | Empedocles et al. ..... 435/288.7 |

OTHER PUBLICATIONS

T. Kaneta, "*Hadamard Transform CE*"; Oct. 1, 2001, pp. 1-10.
Lewis Research Center,"*Stereoscopic, Three-Dimensional PIV With Fuzzy Interference*", Dec. 1997.
R. M. Hammaker et al, "*Multi-dimensional Hadamard Transform Spectrometry*", (1995), pp. 135-138.
R. A. DeVerse et al, "*An Improved Hadamard Encoding Mask For Multiplexed Raman Imaging Using Single Channel Detection*", Apr. 1999, pp. 77-88.
W. C. Sweatt et al, SAND2001-2856C, "*A Plethora of Micro-Optical Systems*". wssweatt@sandia.gov.
R. A. Deverse et al, "*Spectrometry And Imaging Using A Digital Micromirror Array*", Oct. 1998, pp. 1125-1205.
R. A. Deverse et al, "*Hadamard Transform Raman Imagery with s Digital Micro-Mirror Array*", Nov. 1998, pp. 177-186.
W. G. Fateley et al, "Modulations Used to Transmit Information in Spectrometry and Imaging", Sep. 1999, pp. 117-122.
Harwit et al, "Hadamard Transform Optics", 1979, pp. 1-21 & 95-141.

* cited by examiner

*Primary Examiner*—Kanjibhai Patel
(74) *Attorney, Agent, or Firm*—George H. Libman; Carol I. Ashby

(57) ABSTRACT

A staring imaging system inputs a 2D spatial image containing multi-frequency spectral information. This image is encoded in one dimension of the image with a cyclic Hadamarid S-matrix. The resulting image is detecting with a spatial 2D detector; and a computer applies a Hadamard transform to recover the encoded image.

12 Claims, 5 Drawing Sheets

For an image with pixel dimensions (I x J)

$S_{i,j} \equiv$ spectrum at pixel (i,j)

$R \equiv$ detector response $h \equiv$ hadamard order (shown e.g. h=7)

$\mathbf{h} \equiv$ hadamard vector for column i $\begin{Bmatrix} \lambda_1 \\ \lambda_2 \\ \lambda_3 \\ \lambda_4 \\ \lambda_5 \\ \lambda_6 \\ \lambda_7 \end{Bmatrix}$ = $\begin{Bmatrix} e_0 \\ e_1 \\ e_2 \\ e_3 \\ e_4 \\ e_5 \\ e_6 \end{Bmatrix}^{-1}$ × [array of n_0, n_1, n_2, n_3, n_4, n_5, n_6 columns with i=1,2,3,4,5,6,7]

$S_{i,j}$ = $(\mathbf{h}_i{_j})^{-1}$ × $R_{(i:i+(h-1),j)}$, for all n observables

Figure 5

STARING 2-D HADAMARD TRANSFORM SPECTRAL IMAGER

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

There is a need for staring imaging systems capable of real-time high-speed imagery in a large number of spectral bands. (A staring image is a two-dimensional image that is captured at a single point in time, such as a camera image. A scanning image is a one-dimensional image that is scanned over different points in space as a function in time to form a 2-dimensional image). A staring system would be useful for determining if momentary spectral changes occur in a two-dimensional field of view. Such momentary changes could easily be missed by a scanning system.

Existing spectral imaging technologies do not support high-speed imagery because mechanical scanning mechanisms are too slow. Techniques that employ electronic scanning methods and two-dimensional focal planes are required. In addition, techniques that support changing spectral sampling on-the-fly are able to match changing target and background conditions, particularly when it is necessary to optimize signal-to-noise ratio (SNR). In addition, under certain noise conditions, spectral multiplexing techniques have the potential of increasing SNR and decreasing the sample rate for a given measurement.

Multiplexing is well-known in spectroscopy because of its ability to improve SNR. One of the available multiplexing techniques, Hadamard Transform Spectroscopy (HTS). An excellent review of HTS and its mathematical derivations is available in M. Harwit et al., *Hadamard Transform Optics*, Academic Press, 1979.

The optical multiplexing advantage of Hadamard transform spectroscopy is due to a weighing design scheme. By simultaneously measuring multiple wavelength intensities according to a weighing scheme or Hadamard masking order, a corresponding increase in accuracy is observed. Two types of weighing schemes are available. The Hadamard H-matrix weighing design consists of entries corresponding to −1, 0 and +1. The simplex or S-Matrix mask utilizes +1 and 0 in the weighing design. Due to the relative ease in transforming the Hadamard mask encoded data, the additional requirement for a left-cyclic rotation of the S-matrix for each order is common for optical applications of a Hardamard weighing scheme.

FIG. 1A represents a left-cyclic Hadamard S-Matrix weighing design with an order of 7. A black square indicates an off or '0' condition, while a white square is an on or '1'. In the example, each position in the Hadamard mask corresponds to specific wavelength intensity. The resulting 7 observables are multiplied by the inverse of the Hadamard S-matrix, as shown in FIG. 1B, to solve for the individual wavelength intensities. Assuming that detector noise is independent of the amount of light reaching the detector, the SNR improvement approaches $$\sim \frac{\sqrt{n}}{2}.$$

If every nth observable consisted of measuring the intensity at a single wavelength (i.e., the weighting scheme had 6 off positions and 1 on position), the system would be equivalent to a conventional dispersive spectrometer. However, using the example of FIG. 1, the multiplexing advantage is illustrated because for the same seven observables each wavelength intensity is measured four times instead of once. For the Hadamard order of 7, the SNR improvement is negligible. Typical Hadamard orders implement in an actual instrument are 1 to 2 orders of magnitude higher than the example shown in FIG. 1.

Hadamard transform spectral imaging approaches have the potential to achieve the aforementioned improvements in SNR. Significant work in this area has been reported by a team at Kansas State University where a digital micromirror device (DMD™) from Texas Instruments (TI, see L. Hornbeck, U.S. Pat. No. 5,535,047) has been utilized to implement a Hadamard transform spectrometer (HTS). (See R. A. DeVerse et al., *Spectrometry and imaging using a digital micromirror array*, American Laboratory, October 1998, pp. 112S–120S; R. A. DeVerse et al., *Hadamard transform Raman imagery with a digital micro-mirror array*, Vibrational Spectroscopy 19 (1999) 177–186; R. A. DeVerse et al., *An improved Hadamard encoding mask for multiplexed Raman imaging using single channel detection*, Journal of Molecular Structure 521 (2000) 77–88; and W. G. Fateley et al. *Modulations used to transmit information in spectrometry and imaging*, Journal of Molecular Structure (550–551 (2000).) The paper describe the use of a DMD™ (or DMA) as a spatial light modulator for generating a stationary Hadamard encoding mask. The DMD™ in a dispersive flat-field spectrometer was utilized as a 1D Hadamard mask for spectral encoding. Due to the relatively high cost of 2D multichannel detectors in the near and mid infrared, the Raman imaging systems of DeVerse et al employ a single element detector for imaging in the visible spectral region. A 1D Hadamard cyclic S-matrix encoding mask (spectral encoding) is folded into a 2D Hadamard encoding mask and, together with sample rastering a single element detector, can be used for Hadamard transform imaging. While alluding to economic reasons, these papers do not discuss the technical problems that impede the development of viable staring 2D imaging system using a 2D detector and encoding the spectral dimension.

Prior art systems have been developed and proposed that utilize Hadamard encoding of the spatial dimension using a DMD™ or 2d spatial light modulator (SLM) and a 2D detector. The systems encode one spatial dimension by focusing the input image on the DMD™ or SLM and passing the encoded images through a spectrograph (Q. S. Hanley, et al, *Spectral Imaging in a Programmable Array Microscope by Hadamard Transform Fluorescence Spectroscopy*, Applied Spectroscopy, Vol 53, No.1, 1999) or utilize a Fourier Transformed Infrared light source (T. J. Tague, Jr., et al., U.S. Pat. No. 5,923,036).

The DMD™ has a 1024×768 matrix of discrete, rectangular mirrors that are supported on two opposing corners and which may be controllably tilted between a first position where one free corner is down and the opposite free corner is up and a second position where the one free corner is up and the opposite corner is down. The range of motion of each mirror is −10°.

SUMMARY OF THE INVENTION

The present invention provides a staring 2D imaging system utilizing the TI digital micromirror device™ (DMD™) and a 2D detector. The DMD™ is programmed to apply a cyclic S-matrix Hadamard encoding scheme, in either the spatial or spectral dimension, to the entire input scene with the resulting encodegram image cube undergoing the Hadamard transform to decode the encoded dimension. Unlike the prior art for encoding the spatial dimension, one embodiment of the present invention does not require the use of a spectral discriminator (i.e. spectrograph or Fourier transformed infrared light source) to elicit the spectral components of the image. Although only the spatial information is Hadamard encoded, the design and transform mathematics allow the spectral information to decode in conjunction with the Hadamard transform of the spatially encoded image cube. The alternate embodiment of the present invention, which encodes the spectral dimension of the image, differs from the previous art because it does not utilize a slit system with the requisite mechanical rastering components for collecting multiple 1-D slices to build a 2D image.

One embodiment of the staring 2D imager focuses the input scene on the DMD™. For each encoding pattern of the appropriate Hadamard matrix, the x-dimension pixels of the DMD™ apply a cyclic S-matrix encoding scheme to the x-dimension axis of the input image e scene. Each spatially encoded DMD™ image is spectrally dispersed in the x-dimension across a 2D detector. The set of dispersed encodegrams produces a data cube that contains both the Hadamard encoded spatial information and the spectral information that is optically convolved with the spatial. By applying a moving window inverse Hadamard transform to the data cube, the encoded spatial information is separated from the spectral information resulting in a traditional hyperspectral data cube containing two spatial and one spectral dimension.

In an alternative embodiment, the 2D imager disperses the entire 2D input image scene and focuses the dispersed image onto the DMD™. For each encoding pattern of the appropriate Hadamard matrix, the x-dimension pixels of the DMD™ apply a cyclic S-matrix encoding scheme to the spectrally dispersed 2D image, thus encoding the spectral dimension. Each encoded, spectrally dispersed image is then de-dispersed and focused on to a 2D detector thus maintaining the integrity of the spatial information and only the spectral information is Hadamard encoded. The inverse Hadamard transform is applied to the data cube of de-dispersed encodegram resulting in a traditional hyperspectral data cube containing two spatial and one spectral dimension.

Additional advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 5 shows the transformation technique for the first embodiment.

DETAILED DESCRIPTION OF THE INVENTION

Figure 2:
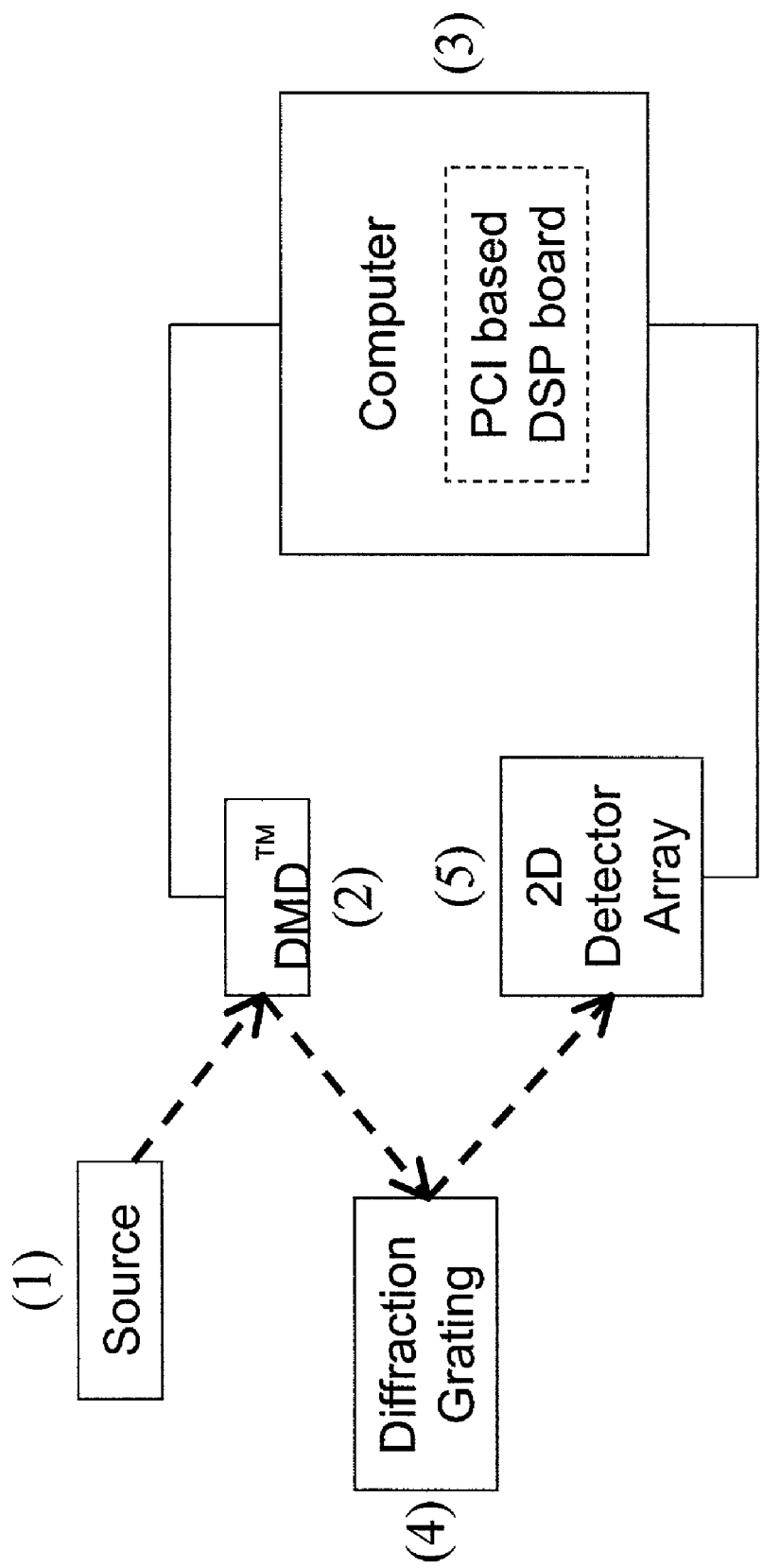
FIG. 2 is a schematic view of a 2D Hadamard Transform Spectral Imager (HTSI) that encodes the spatial dimension according to a first embodiment of the present invention.

Depicted schematically in FIG. 2 are the primary components for an imaging device according to the present invention. An incoming 2D image source 1 is focused on a digital micromirror array such as DMD™ 2. After encoding in the spatial x-dimension on the DMD™ 2, the image is spectrally dispersed by a diffraction grating 4 and the spectrally dispersed, spatially Hadamard-encoded image is directed to a 2D detector array 5. The 2D detector array is read out for each element of the Hadamard encoding sequence, or once for each state of the DMD™ 2. This produces a sequence of data frames that carry mixed spatial and spectral information. The spatial and spectral information are separated in computer 3 by a Hadamard transform using the inversion technique with a moving window (as indicated by $R_{(i:i+(h-1)j)}$, outlined in FIG. 5.

Figure 3:
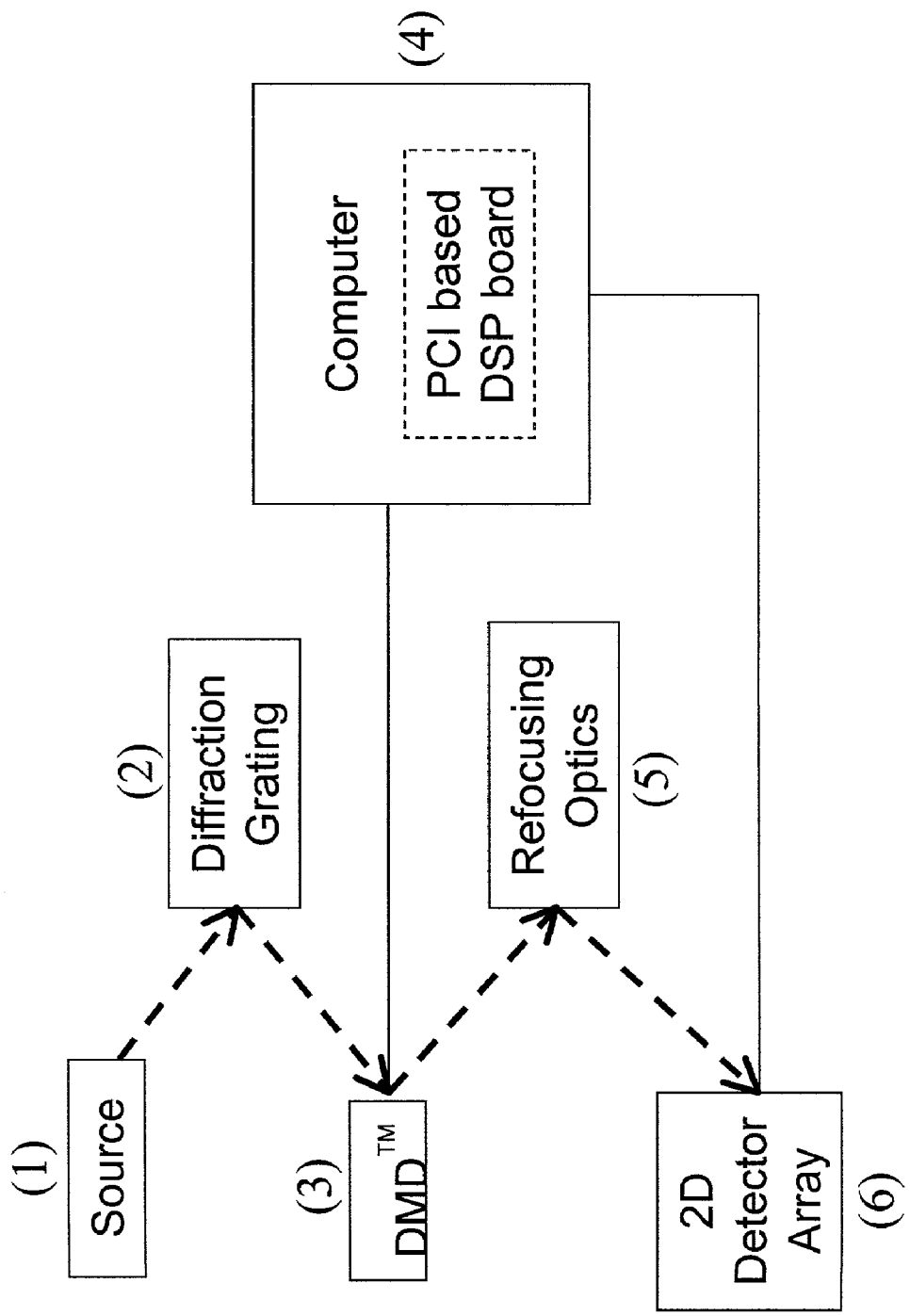
FIG. 3 is a schematic view of a second embodiment of the invention that encodes the spectral dimension.

A second embodiment of the present invention is shown in FIG. 3. The dispersed 2D image source 1 is focused on to a DMD™ 3 by a split-Offner relay. A diffraction grating 2 in the split-Offner relay spectrally disperses the image.

After encoding the dispersed spectral dimension on the DMD™ 3, the image is refocused by a second split-offner relay with a holographic grating 5 and the spectrally Hadamard-encoded image is directed to a 2D detector array 6. The 2D detector array 6 is read out for each Hadamard order and produces a series of image frames, an encodegram image cube, where the x- and y- spatial dimensions have been retained by the 1:1 imaging of the double split-Offner relay optical design and the spectral dimension is Hadamard encoded. The vector of responses at each pixel in the encodegram image cube is multiplied by the inverse of the Hadamard matrix to solve for the wavelength intensities. The total number of wavelengths for the system will correspond to the Hadamard order, thus allowing the staring imager the flexibility of varying the spectral and temporal resolution depending upon the system under observation.

Figure 4:
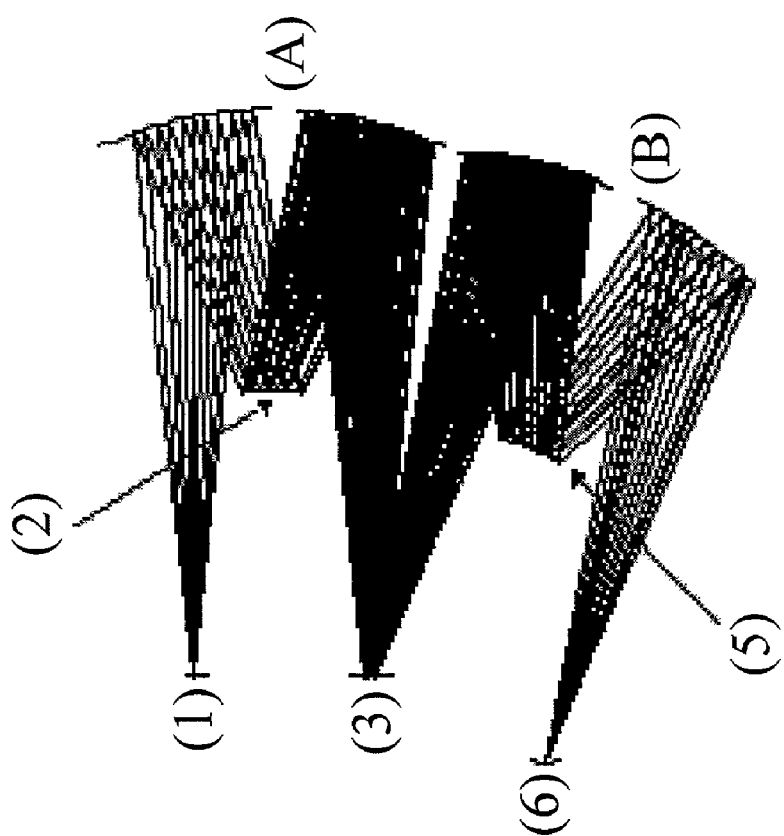
FIG. 4 is a diagram of the optical design detailing the components of the split double Offner Relay and gratings required to correct for the linear axial chromatic aberration in the alternative embodiment shown in FIG. 3.

For the preferred embodiment shown in FIG. 3, there is a tilt in the axis of the receiving optics relative to the plane of the mirrors on DMD 3 from which the light is reflected that causes a shift in the axial source focus as a function of wavelength. The resulting uncorrected axial chromatic aberration in the final image causes the image to be out of focus as a function of wavelength. This linear axial chromatic aberration must be removed or the resulting image will be severely defocused and of unacceptable quality for imaging applications. For this imaging application, the Scheimpflug Condition is used to remove the tilt in the object plane for off-axis field points. FIG. 4 shows a practical implementation of this design approach using an Offner-relay spectrometer design. The grating terms in the two mirrors 2 and 5 are identical, but the second mirror 5 has an added power term to correct for the spectral tilt.

It should be apparent that there are many modifications possible with this invention. For example, the specifications of Texas Instrument's DMD™ include dimensions of 768 pixels in the y-direction, 1024 pixels in the x-direction and a wavelength suitability region of 600 nm to 2.5 $\mu$m. However, the invention is not limited to use at these wavelengths or according to the physical dimensions of this particular digital micromirror array. The invention could use digital micromirror array and spatial light modulator technology with varying spatial and wavelength specifications as long as the devices are capable of generating the cyclic S-matrix masking patterns.

Figure 1:
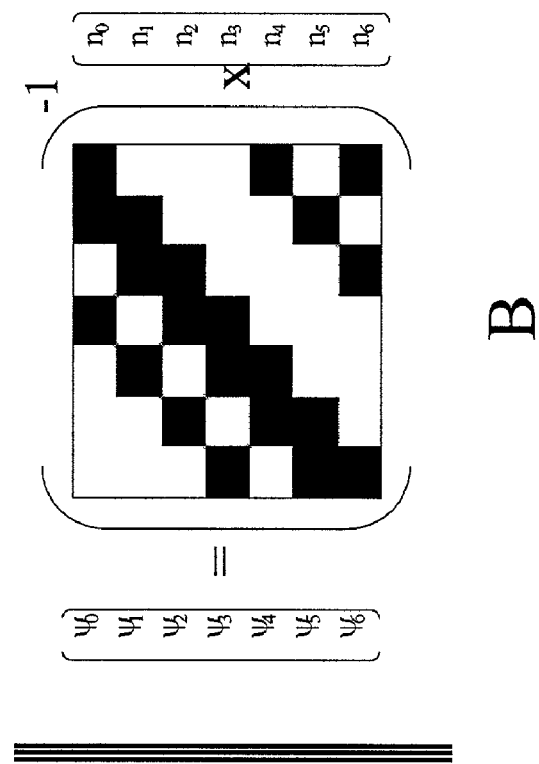
FIG. 1 shows an example of a Hadamard cyclic S-matrix applied to n=7 observables and the inverse transform solution.
Figure 1:
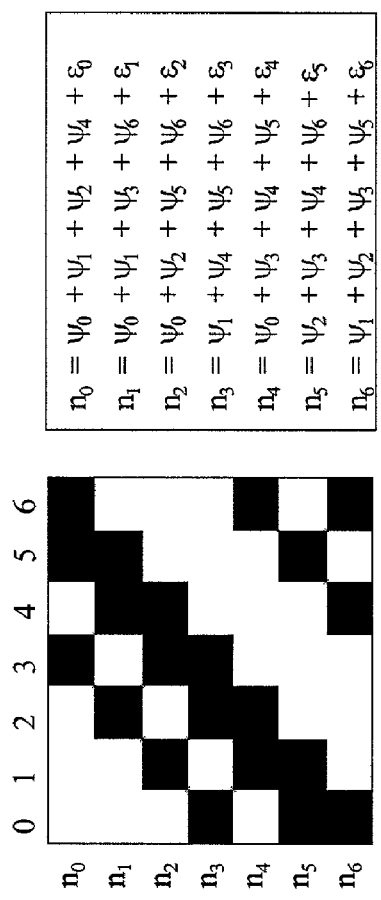

In addition, each masking pattern of the cyclic Hadamard S-matrix is generated in the x-direction on the DMD™ with the pattern extending down the y-direction pixels. Using the cyclic Hadamard S-matrix with an order of 7 shown in FIG. 1 as an example, the DMD™ would generate 7 consecutive masking patterns that would encode the spatial x dimension. The 1024 pixels in the x-direction would be turned "on" or "off" according to the masking pattern (white=on, black=off). The masking pattern would be repeated across the x-direction resulting in 1024/7 consecutive patterns. The "on" or "off" condition of the mask would be continuous in the y-direction pixels. The current micromirror array technology has, for example, 1024×768 separate mirrors that can turn "on" or "off". However, since the "on" or "off" status for the Hadamard masking pattern is continuous in the y-direction, a preferred alternate embodiment for the present invention would include a digital micromirror array with pixel width mirrors that are the full length or fractions thereof in the y-direction of the incoming image. A digital signal process (DSP) board on computer implements the Hadamard masking pattern on the DMD™.

It is intended that the scope of the invention be defined by the appended claims.

What is claimed is:

1. A staring imaging method comprising:
   applying a two-dimensional spatial image containing multi-frequency spectral information to a two-dimensional optical encoder;
   encoding a x-dimension of spatial information from the two-dimensional spatial image with a cyclic Hadamard S-matrix applied by the two-dimensional optical encoder to form a Hadamard spatially encoded image;
   spectrally dispersing in the x-dimension the Hadamard spatially encoded image to form a spatially encoded, spectrally dispersed image;
   focussing the spacially encoded, spectrally dispersed image onto a two-dimensional detector to form a detected image;
   stepping the two-dimensional optical encoder through a plurality of positions and building an untransformed, spatially encoded, and spectrally dispersed data cube from the detected image collected using each position of the two-dimensional optical encoder;
   applying a moving window Hadamard transform to the untransformed, spatially encoded, and spectrally dispersed data cube to deconvolve an encoded spatial dimension; and
   forming a hyperspectral data cube containing two spatial and one spectral dimension as a transform of the two-dimensional spatial image.

2. The staring imaging method of claim 1 wherein the two-dimensional optical encoder is a computer-controlled digital micromirror array.

3. The staring imaging method of claim 2 wherein the computer-controlled digital micromirror array is a Texas Instruments DMD™.

4. The staring imagine method of claim 2 wherein the computer-controlled digital micromirror array has pixel width mirrors in the x-direction and mirrors that extend in the y-direction up to the size of the input image.

5. The staring imaging method of claim 1 wherein the two-dimensional optical encoder is a spatial light modulator.

6. A staring imaging method comprising:
   inputting a two-dimensional spatial image containing multi-frequency spectral information;
   spectrally dispersing the two-dimensional spatial image along an x-dimension;
   applying the spectrally dispersed two-dimensional spatial image to a two-dimensional optical encoder;
   encoding a spectral dimension of the spectrally dispersed two-dimensional spatial image with a cyclic Hadamard S-matrix applied across the x-dimension of the two-dimensional optical encoder to produce a Hadamard-encoded, spectrally dispersed image;
   retaining a spatial x-dimension of the Hadamard-encoded, spectrally dispersed image by de-dispersing the image after optically encoding;
   building an untransformed, spectrally encoded data cube from the the Hadamard-encoded, spectrally dispersed image collected for each Hadamard order; and
   unencoding the untransformed, spectrally encoded data cube by multiplying a vector at each encodegram pixel by an inverse of the Hadamard cyclic S-matrix to generate a hyperspectral data cube containing two spatial and one spectral dimensions.

7. The staring imaging method of claim 6 wherein, the two-dimensional optical encoder is a digital micromirror array, wherein said array introduces at least one linear axial chromatic aberrations into the spectrally dispersed two-dimensional spatiall image; and
   the step of de-dispersing is performed by a grating utilizing a Scheimpflug Condition to correct for the linear axial chromatic aberration by including a power term in the grating to correct for a spectral tilt.

8. The staring imaging method of claim 7 wherein the digital micromirror array is a Texas Instruments DMD™.

9. The staring imagine method of claim 7 wherein the digital micromirror array has pixel width mirrors in the x-direction and mirrors in the y-direction that extend up to the size of the input image.

10. A staring two-dimensional imager comprising:
    a two-dimensional spatial input image;
    a first optical path for applying the input image to a first diffraction grating, wherein the image is spectrally dispersed;
    a second optical path for applying the dispersed image to a two-dimensional digital mirror array;
    a computer for controlling said mirror array to encode the spectrally dispersed image with a cycle S-mask Hardamard transform;
    a third optical path for applying the transformed image from said array to a second diffraction grating, the diffraction of said second grating canceling the dispersion of said first grating;
    a fourth optical path for applying the transformed image from said second diffraction grating to a two-dimensional detector; wherein said computer is connected to said detector for converting said image into data representative of two spatial and one spectral dimension.

11. The imager of claim 10 wherein said encoder is a digital mirror array that introduces spectral tilt into the dispersed image, and wherein said second diffractive grating further includes a power term to compensate for said spectral tilt.

12. The imager of claim 11 wherein said digital mirror array is a DMD™.

* * * * *